(12) United States Patent
Scherrer et al.

(10) Patent No.: US 12,363,059 B2
(45) Date of Patent: Jul. 15, 2025

(54) MESSAGING SYSTEM FOR COMPUTING DEVICES

(71) Applicant: CARIAD SE, Wolfsburg (DE)

(72) Inventors: Jeffery Scherrer, Redmond, WA (US); Robert Gibson, Bothell, WA (US); Jason Ward, Buckeye, AZ (US); Sameer Nafdey, Bellvue, WA (US); Matthew Hartmann, Massapequa, NY (US); Brandon Unkrur, Seattle, WA (US); Filip Brachkov, St. Charles, MO (US); Robert Allen, Lake Forest Park, WA (US)

(73) Assignee: CARIAD SE, Wolfsburg (DE)

( * ) Notice: Subject to any disclaimer, the term of this patent is extended or adjusted under 35 U.S.C. 154(b) by 0 days.

(21) Appl. No.: 18/394,902

(22) Filed: Dec. 22, 2023

(65) Prior Publication Data

US 2025/0047625 A1 Feb. 6, 2025

Related U.S. Application Data

(60) Provisional application No. 63/530,035, filed on Jul. 31, 2023.

(51) Int. Cl.
| | |
|---|---|
| *H04L 51/21* | (2022.01) |
| *H04L 51/07* | (2022.01) |
| *H04L 67/1097* | (2022.01) |
| *H04L 67/60* | (2022.01) |

(52) U.S. Cl.
CPC .............. *H04L 51/21* (2022.05); *H04L 51/07* (2022.05); *H04L 67/1097* (2013.01); *H04L 67/60* (2022.05)

(58) Field of Classification Search
CPC ..... H04L 51/21; H04L 51/07; H04L 67/1097; H04L 67/60; H04L 67/562
See application file for complete search history.

(56) References Cited

U.S. PATENT DOCUMENTS

| | | | |
|---|---|---|---|
| 7,590,098 B2* | 9/2009 | Ganesh | H04L 67/14 |
| | | | 455/418 |
| 2018/0262592 A1* | 9/2018 | Zandi | H04L 67/34 |
| 2021/0342175 A1* | 11/2021 | Lefurgy | G06F 9/45558 |
| 2021/0390853 A1* | 12/2021 | Edwardson | H04W 4/029 |
| 2023/0153183 A1* | 5/2023 | Adolfsson | G06F 9/544 |
| | | | 719/314 |
| 2024/0223674 A1* | 7/2024 | Chakravorty | H04L 41/509 |

FOREIGN PATENT DOCUMENTS

WO  WO-2018096641 A1 *  5/2018 ............. G06F 13/00

* cited by examiner

*Primary Examiner* — Oanh Duong

(57) ABSTRACT

A messaging system is provided to communicate messages between computing devices. The computing devices can include vehicles and service computers. The messaging system includes nodes and virtual entities that may forward messages between computing devices. The messaging system may be a publish-subscribe system. The messaging system may allocate a allocating virtual entities that are associated with the computing devices. The virtual entity may be endpoints for the messages.

20 Claims, 12 Drawing Sheets

MESSAGING SYSTEM FOR COMPUTING DEVICES

CROSS REFERENCE TO RELATED APPLICATIONS

This application claims priority from and the benefit of U.S. Provisional Patent Application No. 63/530,035 entitled "COMMUNICATION SYSTEM FOR COMPUTING DEVICES," filed on Jul. 31, 2023, the entire contents of which are incorporated herein by reference in their entirety.

TECHNICAL FIELD

Aspects of the present disclosure relate to a messaging system, and more particularly, a messaging system for communicating messages between computing devices.

BACKGROUND

Computing devices are often used to perform various actions, operations, services, functions, etc. One type of computing device may be vehicles, such as motorcycles, cars, trucks, vans, planes, drones, boats, submarines, semi-autonomous vehicles, autonomous vehicles, etc. Another type of computing device may be server computers, tablet computers, desktop computers, laptop computers etc. Computing devices often communicate with each other when performing these various actions, operations, services, functions, etc. The computing devices may use a messaging system to transmit and/or receive messages between each other.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
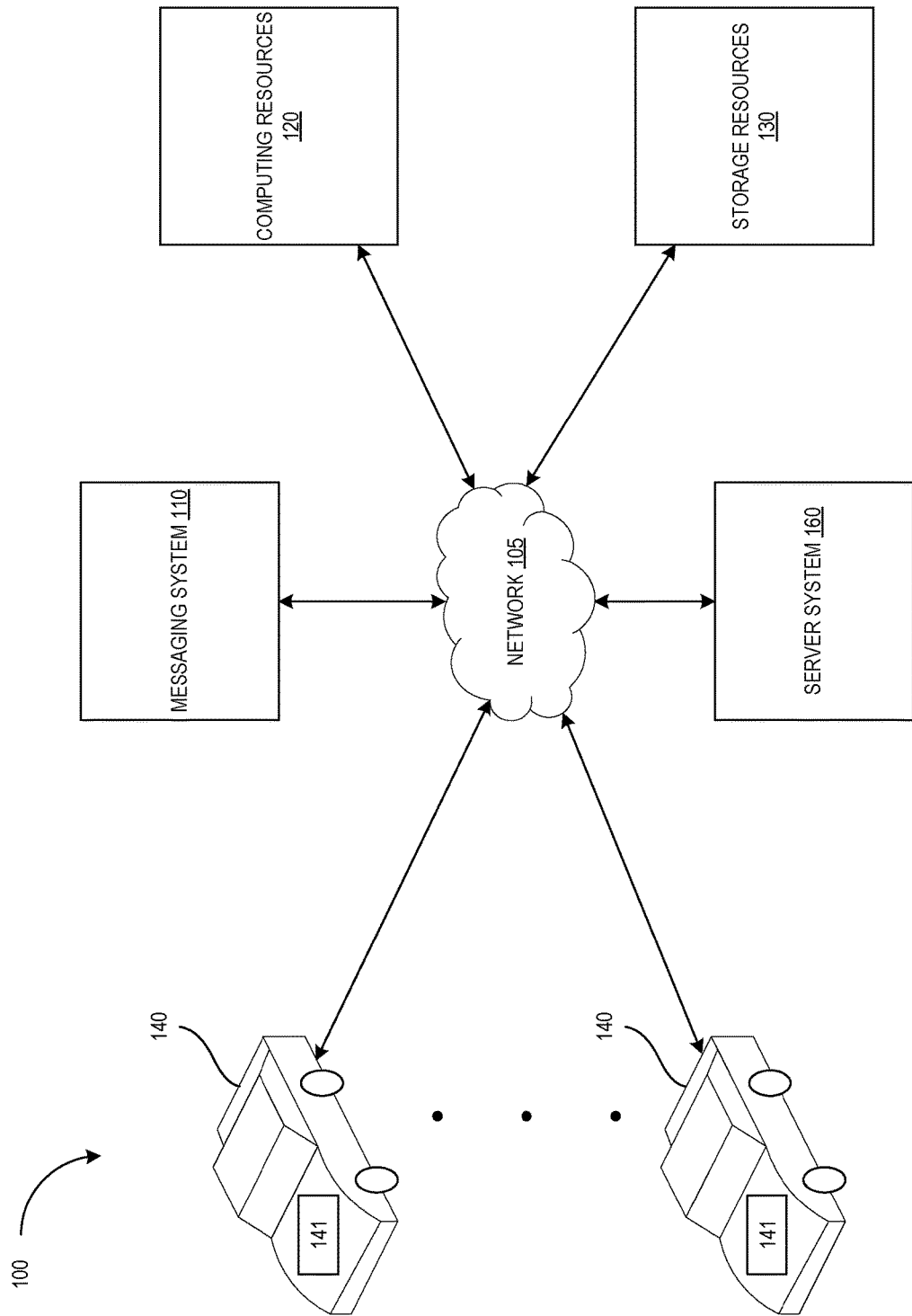
FIG. 1 is a block diagram illustrating an example system architecture, in accordance with one or more embodiments of the present disclosure.

As discussed above, computing devices are often used to perform various actions, operations, services, functions, etc. Computing devices often communicate with each other when performing these various actions, operations, services, functions, etc. The computing devices may use a messaging system to transmit and/or receive messages between each other.

One type of messaging system used by computing devices to communicate with each other may be a publish-subscribe (pub-sub) system (e.g., a publish-subscribe messaging system, a pub-sub system, etc.). A pub-sub system may be a messaging system where publishers publish messages that are received by subscribers. Subscribers may subscribe to topics, classes, or types of messages. Pub-sub systems are discussed in more detail below.

Although a pub-sub system may provide for asynchronous communication and may allow for decoupling of publishers and subscribers, a pub-sub system may not be optimal for direct communication between computing devices. In addition, pub-sub systems often do not directly transmit messages to a specific computing device. Furthermore, pub-sub systems may not track which devices are currently communicating with or connected to the pub-sub system. This may cause problems in the scalability of the messaging system and may also cause delay/latency when transmitting/receiving messages. For example, the pub-sub system may include multiple message brokers for processing messages. When a messages is published by a publisher, each message broker receives a copy of the message. Each message broker may then iterate through a list of computing devices that are coupled to the message broker to determine if any of the devices are subscribed to a topic of the message. If one of the computing devices is subscribed to the topic, the message broker may forward that message to the computing device. This results in wasted processing of messages since a broker iterates through list of computing devices that are coupled to the message broker even if none of the computing devices are subscribed to the topic of the message.

The examples, implementations, and/or embodiments described herein may allow messages to be published to subscribers (e.g., transmitted to subscribers) more quickly and/or efficiently. For example, the messaging systems described herein may allow a first computing device (e.g., a publisher) to use a pub-sub system to transmit a message directly to a second computing device (e.g., a subscriber). In another example, the messaging systems described herein may allow a message to be published to multiple computing devices more quickly and efficiently (e.g., may allow the message to be transmitted only to nodes or message brokers that are coupled to computing devices that subscribed to the topic of the message).

Although the present disclosure may refer to pub-sub systems, the examples, implementations, aspects, and/or embodiments described herein may be used with other types of messaging systems. For example, the Simple Object Access protocol (SOAP) communication systems, representational state transfer (REST) communication systems, etc., may be used in other embodiments.

FIG. 1 is a block diagram that illustrates an example system architecture 100, in accordance with some embodiments of the present disclosure. The system architecture 100 includes a messaging system 110, a server system 160, computing resources 120, storage resources 130, and vehicles 140. Network 105 may interconnect the vehicles 140, the server system 160, the computing resources 120, and/or the storage resources 130. The network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g., cell towers), etc. The network 105 may carry communications (e.g., data, message, packets, frames, etc.) between the vehicles 140, the server system 160, the computing resources 120 and/or the storage resources 130.

The vehicles 140 may be commercial vehicles (e.g., vehicles that are available for purchase or general use), test vehicles, semi-autonomous vehicles, and/or autonomous vehicles (AVs). In one embodiment, the vehicles 140 may be a fleet of vehicles that are used to collect, capture, gather, compile, etc., sensor data and/or other data that may be used to develop, improve, refine, or enhance machine learning models. Machine learning models may be models that may be used to manage and/or control the operation of a vehicle. Each of the vehicles 140 may include various sensors that may generate data (e.g., sensor data) as the respective vehicle operates (e.g., drives, moves around, or is otherwise on). Examples of sensors may include, but are not limited to, tire pressure sensors, steering sensors (e.g., to determine the positions/angles of one or more wheels), a compass, temperature sensors, a global positioning system (GPS) receiver/sensor, a light detection and ranging (LIDAR) device/sensor, an ultrasonic device/sensor, a camera (e.g., a video camera), a radar device/sensor, etc. The sensors of the vehicles 140 may generate sensor data such as video data, image data, GPS data, LIDAR data, time series data, etc. Each of the vehicles 140 by way of its sensors may generate gigabytes (e.g., tens, hundreds, thousands, etc., of gigabytes) of data per hour of operation.

The computing resources 120 may include computing devices which may include hardware such as processing devices (e.g., processors, central processing units (CPUs), processing cores, graphics processing units (GPUS)), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 120 may also include virtual environments. In one embodiment, a virtual environment may be a virtual machine (VM) that may execute on a hypervisor which executes on top of the OS for a computing device. The hypervisor may also be referred to as a virtual machine monitor (VMM). A VM may be a software implementation of a machine (e.g., a software implementation of a computing device) that includes its own operating system (referred to as a guest OS) and executes application programs, applications, software. The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may present other software (i.e., "guest" software) the abstraction of one or more virtual machines (VMs) that provide the same or different abstractions to various guest software (e.g., guest operating system, guest applications). A VM may execute guest software that uses an underlying emulation of the physical resources (e.g., virtual processors and guest memory).

In another embodiment, a virtual environment may be a container that may execute on a container engine which executes on top of the OS for a computing device, as discussed in more detail below. A container may be an isolated set of resources allocated to executing an application, software, and/or process independent from other applications, software, and/or processes. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device. The container engine may also be used to create, remove, and manage containers.

The storage resources 130 may include various different types of storage devices, such as hard disk drives (HDDs), solid state drives (SSD), hybrid drives, storage area networks, storage arrays, etc. The storage resources 130 may also include cloud storage resources or platforms which allow for dynamic scaling of storage space.

Although the computing resources 120 and the storage resources 130 are illustrated separate from the server system 160, one or more of the computing resources 120 and the storage resources 130 may be part of the server system 160 in other embodiments. For example, the server system 160 may include both the computing resources 120 and the storage resources 130.

In one embodiment, the server system 160 may be a collection of one or more computing devices (e.g., one or more server computers), hardware, software, firmware, a cloud computing system/platform, and/or other devices/systems. The server system 160 may perform various functions, operations, actions, services, etc., for the vehicles 140. For example, the server system may include computing services that may perform various actions/operations for a vehicle 140 (e.g., may track maintenance information for a vehicle 140, may provide navigation/route information to a vehicle 140, etc.). In another example, the server system 160 may transmit information to a vehicle 140. For example, the server system 160 may transmit an alert indicating that a condition has occurred to a vehicle 140. Although one server system 160 is illustrated in FIG. 1, more server systems may be included in the system architecture 100 in other embodiments. For example, different sets of computing services may be located in and/or provided by different server systems.

In one embodiment, the messaging system 110 may also be a collection of one or more computing devices (e.g., one or more server computers), hardware, software, firmware, a cloud computing system/platform, and/or other devices/systems. The messaging system 110 may forward messages between the vehicles 140 and the server system 160. For example, the vehicle 140 may transmit messages to the server system 160 via the messaging system 110. In another example, the server system 160 (e.g., a computing service and/or a server computer) may transmit a message to one or more vehicles 140 via the messaging system 110.

In one embodiment, the server system 160 may manage the allocation, deallocation, and/or use of computing resources 120 (e.g., computing clusters, server computers, VMs, containers, etc.). The computing resources 120 may be used for data transformation, feature extraction, execution of machine learning models, etc. The computing resources 120 may use various cloud service platforms (e.g., cloud computing resources). The server system 160 may also manage the allocation and/or use of storage resources 130.

In one embodiment, the messaging system 110 may be a publish-subscribe (pub-sub) system (e.g., a publish-subscribe messaging system, a pub-sub system, etc.). A pub-sub system may be a messaging system where publishers (e.g., computing devices that transmit messages) associate messages with classes/topics that are received by subscribers. Subscribers (e.g., computing devices that receive and/or are interested in classes/types of messages) may subscribe to topics, classes, or types of messages (e.g., may indicate that they are interested in certain topics). A publisher may not be aware of the subscribers in a pub-sub system, and vice versa. A publisher of messages may also be a subscriber.

In one embodiment, publisher may publish (e.g., post, transmit, etc.) messages to one or more message brokers (e.g., an intermediate device). A subscriber may also register with one or more message brokers. A message broker may perform filtering of messages, authentication, forwarding of messages, tracking/manage of subscriptions, etc.

In one embodiment, the messaging system 110 may include one or more device connections systems, as discussed in more detail below. A device connection system may include nodes (e.g., processing nodes, computing devices, etc.) that allow computing devices to connect to the messaging system 110. For example, a first device connection system may allow vehicles 140 to connect to the messaging system 110. In another example, a second device connection system may allow one or more server systems 160 to connect to the messaging system.

In one embodiment, the device connection systems may use virtual entities to establish connections between computing devices via the messaging system. The virtual entities may allow the vehicles 140 and/or server system 160 (e.g., one or more server computers) to establish network connections with the messaging system 110.

Figure 2:
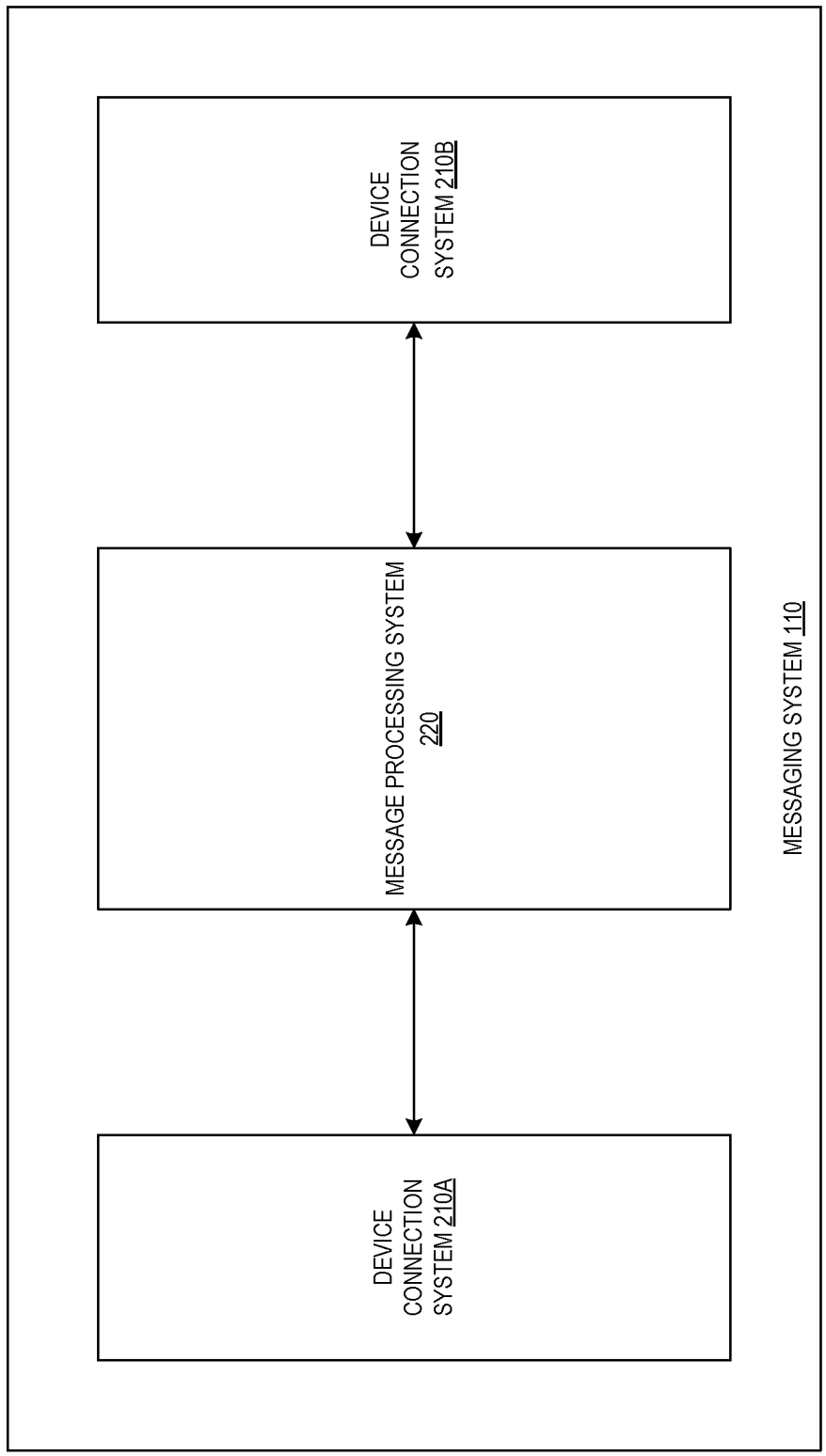
FIG. 2 is a block diagram illustrating an example messaging system, in accordance with one or more embodiments of the present disclosure.

FIG. 2 is a block diagram that illustrates and example messaging system 110, in accordance with one or more embodiments of the present disclosure. The messaging system may include a device connection system 210A, a device connection system 210B, and a message processing system 220. Some or all of the modules, components, systems, units, elements, nodes, engines, etc., illustrated in FIG. 2 may be implemented in software, hardware, firmware, or a combination thereof.

In one embodiment, the messaging system 110 include one or more device connections systems. For example, the messaging system 110 includes device connection system 210A and device connection system 210B. Either of device connection system 210A and device connection system 210B may be referred to herein as a device connection system 210. A device connection system 210 may include nodes (e.g., processing nodes, computing devices, etc.) that allow computing devices to connect to the messaging system 110. For example, referring to FIG. 1, a first device connection system may allow vehicles 140 to connect to the messaging system 110. In another example, a second device connection system may allow one or more server systems 160 to connect to the messaging system.

In one embodiment, the device connection systems may use virtual entities to establish connections between computing devices via the messaging system, as discussed in more detail below. The virtual entities may allow the vehicles 140 and/or server system 160 (e.g., one or more server computers) to establish network connections with the messaging system 110. The virtual entities may also serve/operate as endpoints within the messaging system 110 for messages.

The messaging system 110 also includes a message processing system 220. The message processing system 220 may be used to forward messages between computing devices (e.g., between vehicles 140 and server computers), as discussed in more detail below. The message processing system 220 may include one or more nodes that may be used to forward messages between device connection systems 210A and 210B.

Figure 3:
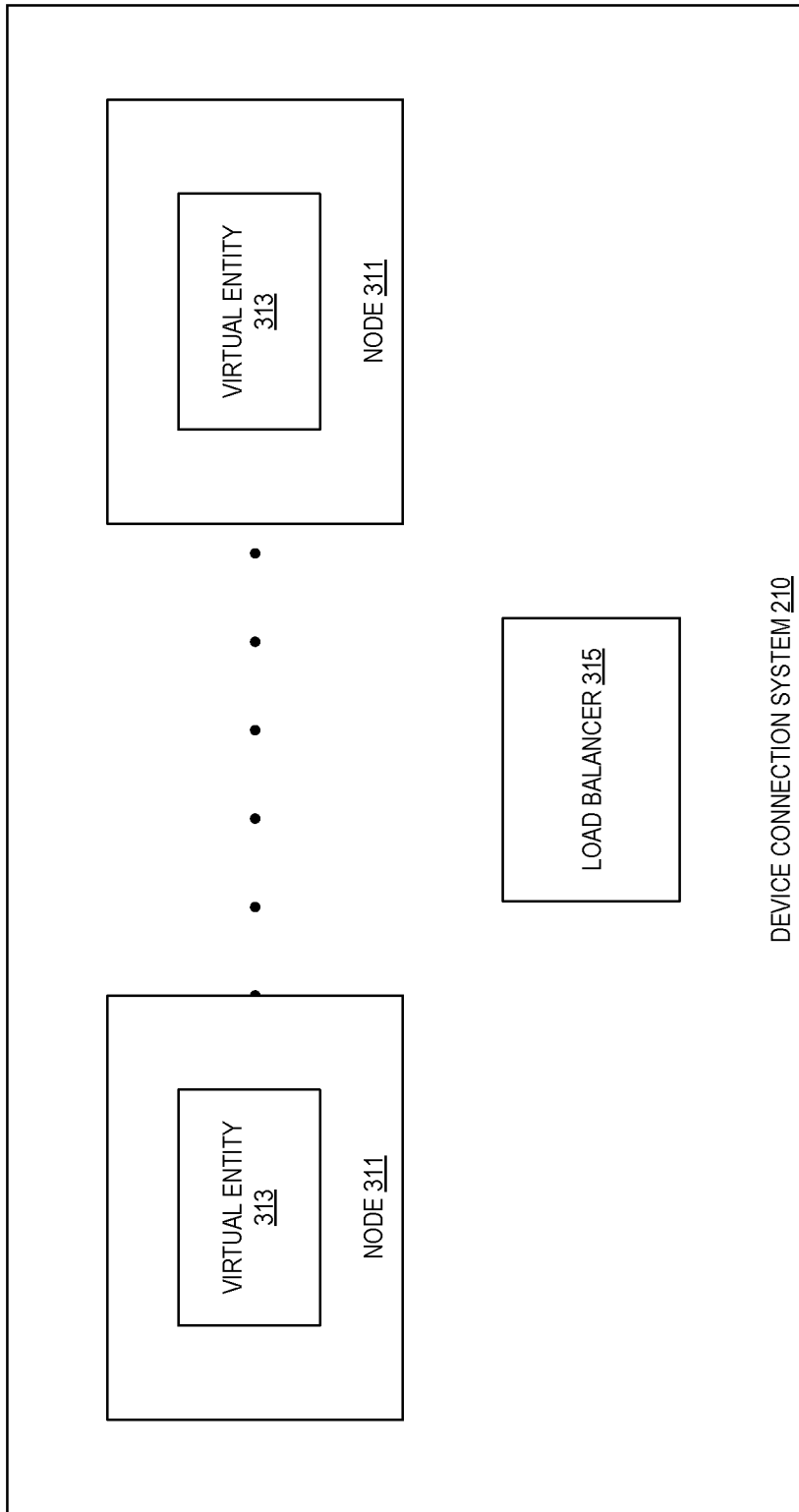
FIG. 3 is a block diagram that illustrates an example device connection system, in accordance with one or more embodiments of the present disclosure.

FIG. 3 is a block diagram that illustrates an example device connection system 210, in accordance with one or more embodiments of the present disclosure. The device connection system 210 includes one or more nodes 311 and a load balancer 313. Some or all of the modules, components, systems, units, elements, nodes, engines, etc., illustrated in FIG. 3 may be implemented in software, hardware, firmware, or a combination thereof. The device connection system 210 may be part of a messaging system 110 (e.g., as illustrated in FIGS. 1 and 2).

A node 311 may be a collection of resources that are used by the device connection system 311 to perform various operations, functions, tasks, processes, etc. For example, a node 311 may include hardware (e.g., processing devices, computers, etc.), software, firmware, etc., that may be used to execute or run virtual entities, as discussed in more detail below. The nodes 311 may be located in different geographical locations. For example, the nodes 311 may be distributed across a geographical location/area to allow for less latency between a node 311 and a computing device.

A node 311 may include one or more virtual entities 313. A virtual entity 311 may be an object, a class, a service, a process, etc., that is executing and/or located within a node 311. A virtual entity 311 may be created, instantiated, allocated, generated, etc., when a computing device (e.g., a vehicle 140 and/or a server system 160 as illustrated in FIG. 1) connects to the messaging system. For example, a computing device may transmit a request to the messaging system 110 requesting to connect to the messaging system 110. The device connection system 210 may receive the request and provide the request to a load balancer 315.

In one embodiment, the load balancer 315 may select one of the nodes 311 (from the one or more nodes 311) to use for allocating a virtual entity 313 for the computing device (e.g., identify/select a node 311 where the virtual entity 313 will be located) and/or for establishing a connection (e.g., a network connection) with the computing device. The load balancer 315 may use one or more criterion, parameters, factors, etc., for selecting one of the nodes 311. For example, the load balancer 315 may select a node 311 based on a schedule. In another example, the load balancer 315 select the node 311 that is closest to the geographical location of the computing device that is requesting to connect to the messaging system 110. In a further example, the load balancer 315 may select a node 311 based on a current load of the node 311 (e.g., the amount of processing operations being performed, the number of other virtual entities 311 that already exist on a node 311, etc.). The criterion, parameters, factors, etc., for selecting a node 311 may be referred to as node selection criterion.

In one embodiment, the node 311 identified/selected by the load balancer 315 may allocate the virtual entity 313. For example, the node 311 may instantiate, create, allocated, etc., a virtual entity 313 for the computing device. The virtual entity 313 may execute within the identified/selected node 311. The virtual entity 313 may remain on the node 311 until the virtual entity 313 is moved and/or deallocated, as discussed in more detail below.

In one embodiment, the virtual entity 313 may be an endpoint for messages within the messaging system 110. For example, messages received from a server computer, service, etc., for the computing device may be addressed to the virtual entity 313 that is associated with the computing device. In another example, messages from the computing device to be transmitted to another computing device may be transmitted from the virtual entity 313 as a starting point within the messaging system 110.

In one embodiment, a network connection may exist or may be established between the computing device and the node 311 where the virtual entity 313 associated with that computing device is located. For example, an Internet Protocol (IP) connection may exist between the node 311 and the computing device. In another example, an HTTP connection may exist between the node 311 and the computer device. Various types of network protocols and connections may be used for the network connection between the node 311 and the computer device.

In one embodiment, a virtual entity 313 may be associated with a particular computing device. For example, a virtual entity 313 may be associated with the particular computing device that the virtual entity 313 was allocated for. Because the virtual entity 313 is associated with a particular computing device, all messages that are communicated (e.g., transmitted and/or received) by the computing device may be communicated via the virtual entity 313.

A virtual entity 313 may be associated with and/or may be assigned an identifier by the respective node 311. For example, a node 311 may create/generate an identifier for each virtual entity 313 that is located on the node 311. The identifier for a virtual entity 313 may also be referred to as a virtual entity identifier, a virtual entity ID, etc. The identifier for a virtual entity 313 may be unique within the messaging system 110. For example, an identifier may not be used more than once within the messaging system 110.

In one embodiment, a node 311 may receive a message meant for or addressed to the computing device. As discussed above, the message may be received from a server computer by the virtual entity 313. Because the computing device has a network connection with the node 311 where the virtual entity 313 is located, the virtual entity 313 may be able to directly transmit the message to the computing device.

In another embodiment, the node 311 may receive a message meant for or addressed to another computing device (e.g., a server computer). Because the computing device has a network connection with the node 311 where the virtual entity 313 is located, the virtual entity 313 may receive the message from the computing device and may transmit the message to the other computing device via the messaging system 110.

As discussed above, the messaging system 110 may be and/or may include a pub-sub system. The messages that are transmitted/received by the computing device via an associated virtual entity 313 and/or node 311 may be types of messages that are used by the pub-sub system. For example, the messages may include be a message for subscribing the computing device to a topic of the pub-sub system. In another example, the messages may include a message that was published by another computing device for the topic of the pub-sub system. In a further example, the messages may include a message requesting to subscribe to a topic of the pub-sub system. In yet another example, the messages may include control messages for the pub-sub system.

In one embodiment, the load balancer 300 and/or a node 311 may determine that a computing device should be moved to a different node 311. For example, a computing device (e.g., a vehicle 140) may change geographical location. As the computing device changes geographical locations (e.g., moves), the node 311 and/or load balancer 315 may determine that the computing device should be connected to a different node 311 (e.g., to reduce latency). The computing device may establish a new network connection with the different node 311 and may disconnect or remove the network connection with the previous node 311. The load balancer 300 and/or the node 311 may use one or more criterion (e.g., the node selection criterion discussed above) when determining whether to move the computing devices to the different node 311.

In one embodiment, when moving a computing device to a different node 311, the virtual entity 313 associated with the computing device may be moved or deallocated. For example, the virtual entity 313 for the computing device may be moved to the different node 311 when the computing device establishes a network connection with the different node 311. In another example, the virtual entity for the computing device may be deallocated (e.g., removed, deleted, stopped, etc.) on the original node 311 and may be allocated on the different node 311 (e.g., the new node 311).

In one embodiment, the nodes 311 may also perform authentication for the computing devices that may request to connect to the messaging system. For example, a node 311 may request a digital certificate from a computing device and may verify/authenticate the digital certificate before allowing a computing device to connect to the messaging system. In another example, a node 311 may request an authentication token (or other authentication credential) and may verify the authentication token before allowing the computing device to connect to the messaging system.

Different authentication mechanisms/credentials may be used for different device connection systems 210 and/or different computing devices.

Figure 4:
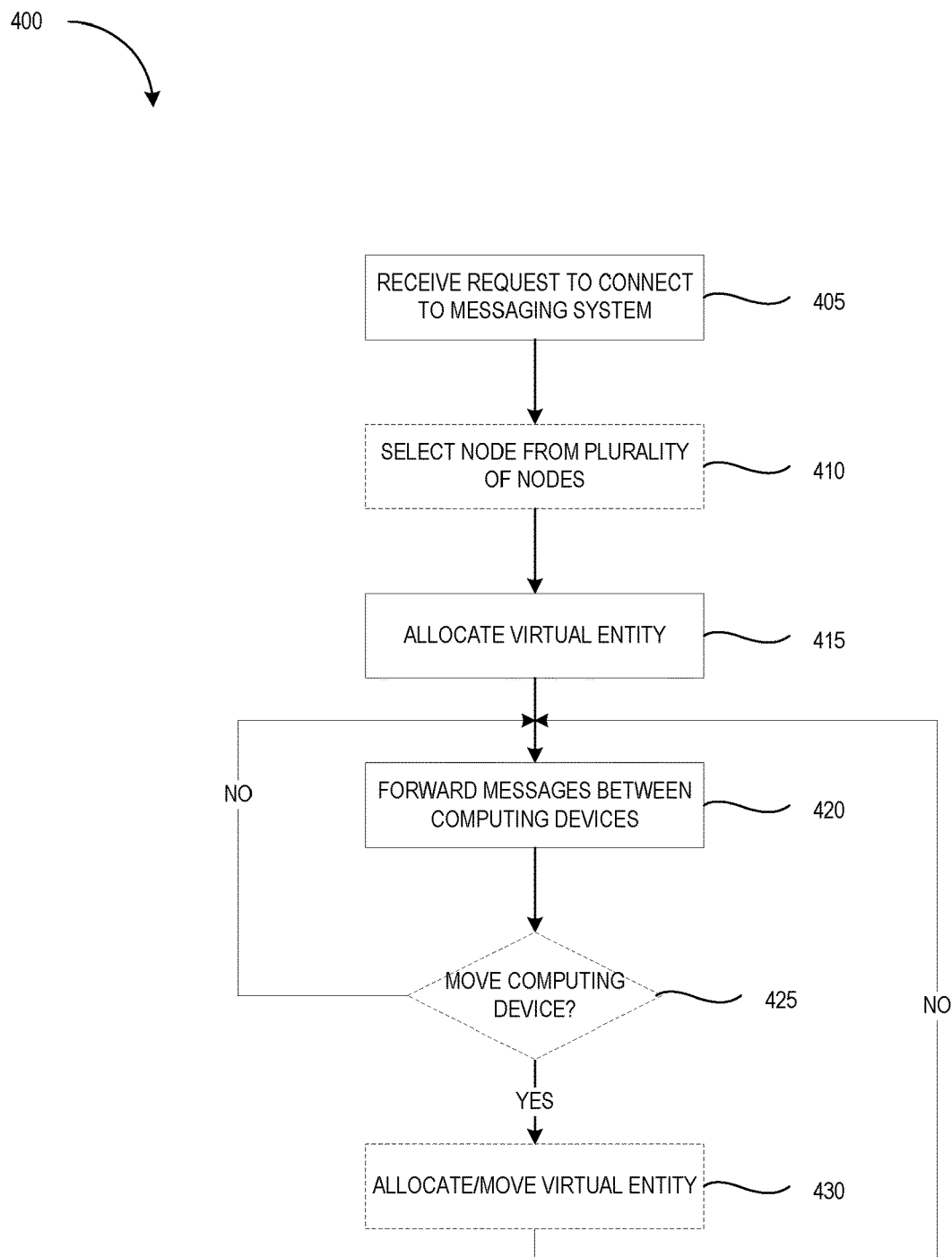
FIG. 4 is a flow diagram of a process for communicating messages via a messaging system (such as a pub-sub system), in accordance with one or more embodiments of the present disclosure.

FIG. 4 is a flow diagram of a process 400 for communicating messages via a messaging system (such as a pub-sub system), in accordance with one or more embodiments of the present disclosure. Process 400 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 400 may be performed by one or more of a computing device, a messaging system, a device connection system, a node, a load balancer, and a virtual entity.

With reference to FIG. 4, process 400 illustrates example functions used by various embodiments. Although specific function blocks ("blocks") are disclosed in process 400, such blocks are examples. That is, embodiments are well suited to performing various other blocks or variations of the blocks recited in process 400. It is appreciated that the blocks in process 400 may be performed in an order different than presented, and that not all of the blocks in process 400 may be performed, and other blocks (which may not be included in FIG. 4) may be performed between the blocks illustrated in FIG. 4.

The process 400 begins at block 405 where the process 400 receives a request from a computing device (e.g., a vehicle and/or a server computer) to connect to a messaging system. For example, a computing device may transmit a request to connect to the messaging system. The messaging system may be a pub-sub system as discussed above. At block 410, the process 400 may optionally select a node from a plurality of nodes of the messaging system. For example, the process 420 may use one or more criterion (e.g., node selection criterion, parameters, factors, etc.) to select a node. The selected node will be used to establish a connection (e.g., a network connection) with the computing device.

At block 415, the process 400 may allocate a virtual entity for the computing device. As discussed above, the virtual entity may be an object, class, service, process, etc., that is located on and/or executing on the selected node. The virtual entity may have an identifier (e.g., a unique identifier) and may be associated with the computing device. The virtual entity may also be an endpoint (e.g., a starting point and/or an ending point) for messages within the messaging system.

At block 420 the process 400 may forward messages between the computing device and other computing devices via the messaging system. For example, the process 400 may transmit a message from the computing device to another computing device via the virtual entity and/or node. In another example, the process 400 may receive a message from another computing device via the virtual entity and/or node and may forward/transmit that messages to the computing device. As discussed above, various types of messages may be communicated between the computing device and other computing device (e.g., messages to subscribe to a topic, messages published for a topic, control messages, etc.).

At block 425, the process 400 may optionally determine whether to move the computing device to another node. For example, the process 400 may periodically revaluate one or more criterion (e.g., node selection criterion). Based on the one or more criterion, the process 400 may determine that the computing device should be moved to another node. If the computing device should not be moved to another node, the process 400 may continue at block 420. If the process 400 determines that the computing device should be moved to another node, the process 400 may allocated another virtual entity on the other node and/or move the virtual entity from the previous node to the other node at block 430. The process 400 may also establish a network connection between the computing device and the other node at block 430.

Figure 5:
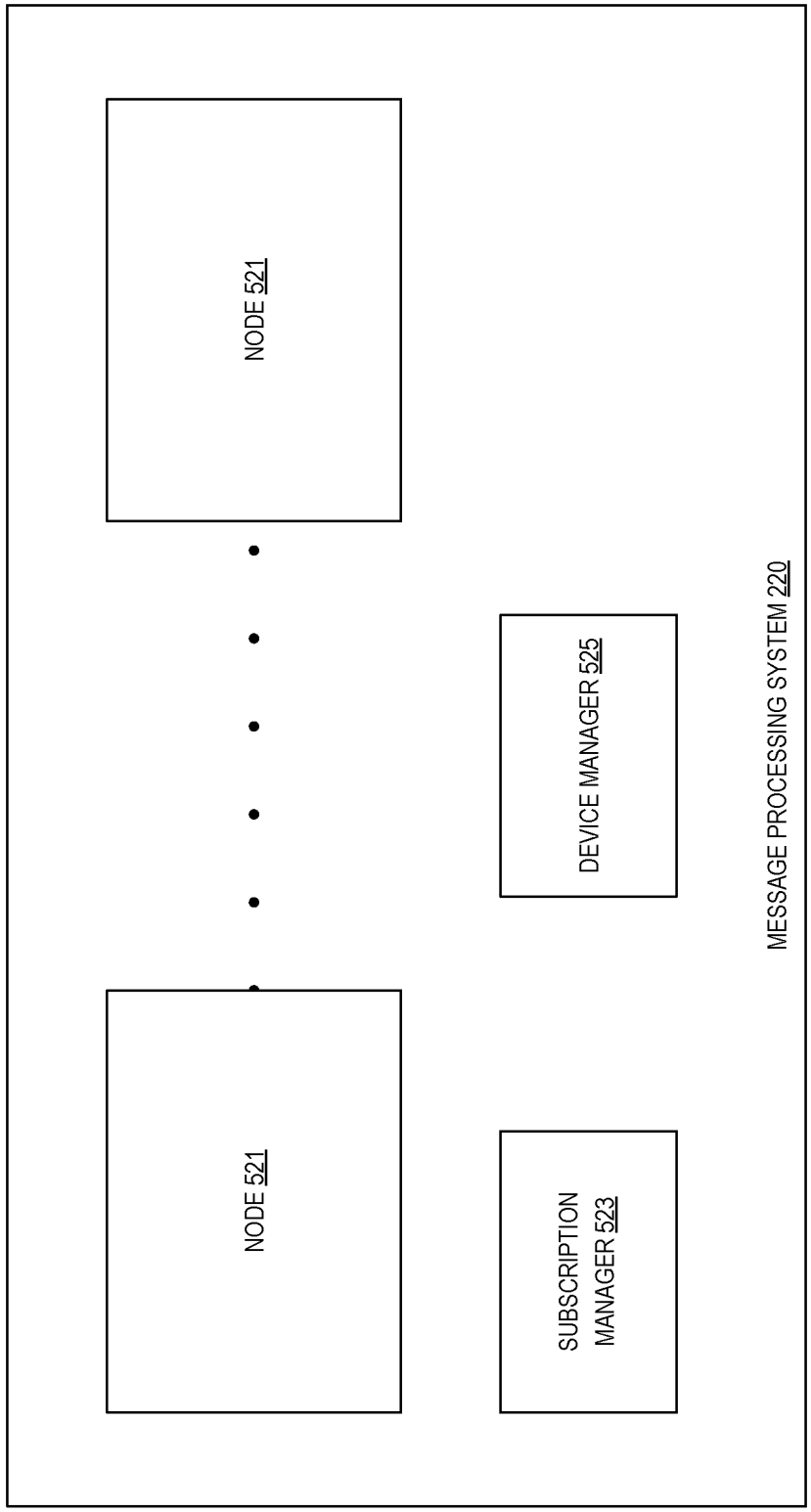
FIG. 5 is a diagram illustrating an example message processing system, in accordance with one or more embodiments of the present disclosure.

FIG. 5 is a block diagram that illustrates an example message processing system 220, in accordance with one or more embodiments of the present disclosure. The message processing system 220 includes nodes 221, a subscription manager 523, and a device manager 525. Some or all of the modules, components, systems, engines, etc., illustrated in FIG. 5 may be implemented in software, hardware, firmware, or a combination thereof. The message processing system 220 may be part of a messaging system 110 (e.g., as illustrated in FIGS. 1 and 2).

In one embodiment, the subscription manager 523 may track and/or manage topics and/or subscriptions to the topics. For example, the subscription manager 523 may track/manage a list of topics that computing devices can subscribe to. The subscription manager 523 may allow computing devices to create a topic, delete a topic, modify a topic (e.g., modify a name/identifier for the topic, modify a description or other data for a topic, etc.). The subscription manager 523 may also track/manage subscriptions to the topics. For example, a computing device may subscribe to one or more topics. The subscription manager 523 may track which computing devices are subscribed to which topics. The subscription manager 523 may use identifiers for the computing devices and/or virtual entities associated with the computing devices to track/manage the subscriptions. For example, the subscription manager 523 may maintain a database, a list, a record, or some other data indicating which computing devices and/or virtual entities are subscribed to which topics (e.g., a list associating different identifiers with different topics).

In one embodiment, the device manager 525 may track and/or manage virtual entities that are associated with computing devices. As discussed above, when a computing device connects and/or registers with the messaging system, a device connection system may allocate a virtual entity on a node of the device connection system. The device manager 525 may communicate with a device connection system to an identifier for the virtual entity and an identifier indicating the node of the device connection system where the virtual entity is located. This allows the device manager 525 to track and/or manage the locations of virtual entities.

In one embodiment, the subscription manager 523 and the device manager 525 may be hardware, software, firmware, or a combination thereof for performing the various operations, actions, functions, processes, etc., discussed herein.

In one embodiment, the message processing system 220 may allow computing devices to transmit messages directly each other, as discussed in more detail below. For example, even though the message processing system 220 may be a pub-sub system (or may include a pub-sub system), the message processing system 220 may allow a first computing device to transmit a message directly to a second computing device via the pub-sub system. This may be referred to as direct communication, direct messaging, one-to-one communication, one-to-one messaging, etc.

In one embodiment, a node 521 may receive a message from a first computing device via a first virtual entity (which may be located on a device connection system). The first virtual entity may be associated with the first computing device. For example, the node 521 may receive a message from a vehicle via a virtual entity associated with the vehicle. The virtual entity may be located on another node within a device communication system, as illustrated in FIG. 3. A node 521 may also be referred to as a broker, message broker, etc.

In one embodiment, a node 521 may identify a second virtual entity (which may be located on a device connection system) based on the message. For example, the node 521 may determine whether the message includes an identifier (e.g., a name, an ID number, a string, or some other appropriate data for identifying a device) for the second virtual entity and/or for a second computing device. The second computing device may be associated with the second virtual entity, as discussed above. Using the identifier, the node 521 may be able to identify the second virtual entity for the second computing device.

In one embodiment, a node 521 may forward the message (e.g., transmit the message) to the second computing device via the messaging system. For example, the node 521 may determine the node (of a device connection system) where the second virtual entity is located. The node 521 may directly forward the message that was received via the first virtual entity (located in a first device connection system) to the second virtual entity (located in the second device connection system).

In one embodiment, the node 521 may optionally determine whether the second computing device is subscribed to a topic associated with the messages. For example, the messaging system may be a pub-sub system that may use topics and subscriptions. The node 521 may identify/determine a topic for the message and may determine whether the second computing device has subscribed to that topic. In one embodiment, the node 521 may not forward the message to the second computing device and/or second virtual entity if the second computing device is not subscribed to the topic. In another embodiment, the node 521 may forward the messages to the second computing device and/or second virtual entity regardless of whether the second computing device is subscribed to the topic of the messages. For example, if the payload of the message includes an identifier for the second computing device and/or second virtual entity, the node 521 may forward the messages to the second computing device and/or second virtual entity.

In one embodiment, the node 521 may identify a node in a device connection system where the second virtual entity is located based on an identifier for the second virtual entity and/or second computing device. As discussed above, the identifier for the second virtual entity and/or second computing device may be part of the message (e.g., in a payload of the message). The node 521 may communicate with the device manager 525 to identify the node in the device connection system where the second virtual entity is located. The node 521 may directly forward the message to the identified node. For example, the message may have been received from a different node of a different device communication system and the node 521 may forward the message directly from the different node to the identified node.

In some embodiments, the node 521 may refrain from transmitting and/or forwarding the messages to other nodes in the message system. For example, the node 521 may identify virtual entities and/or computing devices that should receive a message, as discussed above. The node 521 may also identify the nodes where the identified virtual entities are located. The node 521 may transmit the messages only to the identified nodes. For example, rather than transmitting the messages to all of the nodes of the device connection systems the node 521 may transmit the messages to only the nodes that are connected computing devices that are subscribed to the topic of the message.

In one embodiment, a node 521 may transmit a message to multiple computing devices via multiple virtual entities, and each of the virtual entities may be located on a respective node in a respective device connection system. This may be referred to a multicast/broadcast communication, multicast/broadcast messaging, one-to-many communication, one-to-many messaging, etc. Although the messaging system may be a pub-sub system as described above, the messaging system may still reduce or limit the number of nodes that a message may be transmitted to during one-to-many communication. For example, rather than transmitting a message to all nodes (e.g., brokers, message brokers, etc.) in the messaging system, the messaging system may transmit messages to the nodes are connected to computing devices that are subscribed to or allowed to receive the message, as discussed in more detail below.

In one embodiment, a node 521 may receive a message from a first computing device via a first virtual entity. The first virtual entity is located in a first device connection system and is associated with the first computing device. The node 521 may determine that a set of computing device should receive the message. For example, the node 521 may communicate with the subscription manager 523 to identify a set of computing devices that are subscribed to a topic associated with the message. The node 521 may also communicate with the device manager 525 to identify a set of virtual entities that are associated with the set of computing devices (e.g., to identify a virtual entity for each computing device in the set of computing devices). Each virtual entity may be located in a node of a device connection system. Thus, the set of virtual entities may be located across multiple nodes of the device connection system (e.g., a subset of the nodes in the device connection system).

In one embodiment, the node 521 may forward the messages to the set of computing devices via the first virtual entity and the set of virtual entities. For example, the node 521 has already identified the nodes of the device connection system where the set of virtual entities are located. The node 521 may forward the message directly from the first node (where the first virtual entity is located) to the identified nodes of the device connection system. The node 521 may refrain from forwarding the message to other nodes in the device connection system. For example, the node 521 may forward the message to only the identified nodes.

Figure 6:
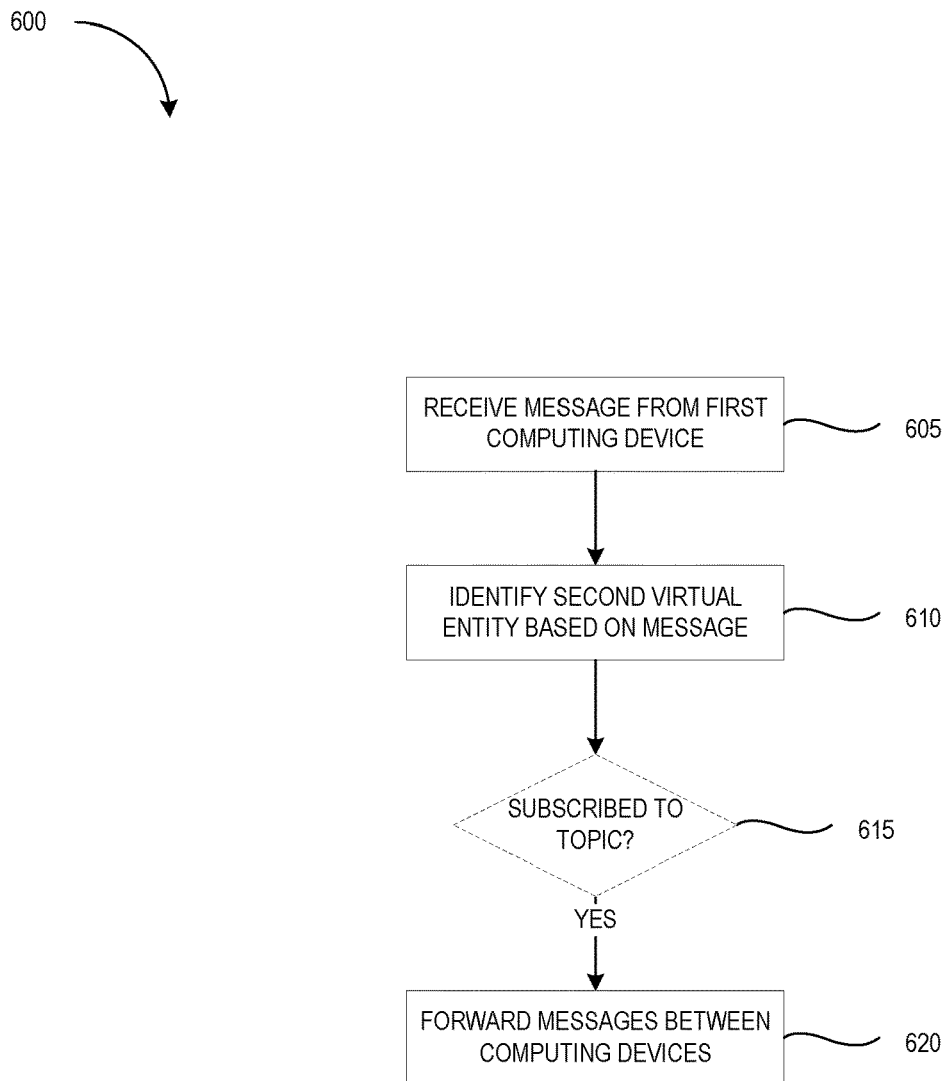
FIG. 6 is a flow diagram of a process for communicating messages via a messaging system (such as a pub-sub system), in accordance with one or more embodiments of the present disclosure.

FIG. 6 is a flow diagram of a process for communicating messages via a messaging system (such as a pub-sub system), in accordance with one or more embodiments of the present disclosure. Process 600 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 600 may be performed by one or more of a computing device, a messaging system, a message processing system, a node, etc.

With reference to FIG. 6, process 600 illustrates example functions used by various embodiments. Although specific function blocks ("blocks") are disclosed in process 600, such blocks are examples. That is, embodiments are well suited to performing various other blocks or variations of the blocks recited in process 600. It is appreciated that the blocks in process 600 may be performed in an order different than presented, and that not all of the blocks in process 600 may be performed, and other blocks (which may not be included in FIG. 6) may be performed between the blocks illustrated in FIG. 6.

The process 600 begins at block 605 where the process 600 receives a message from a first computing device. The message may be received via a first virtual entity of a first device connection system. At block 610, the process 600 may identify a second virtual entity of a second device connection system based on the message. For example, the process may identify the second virtual entity based on an identifier in the message. The second virtual entity is associated with a second computing device that may be a recipient for the message. The identifier may be associated with the with one or more of the second computing device and the second virtual entity.

At block 615, the process 600 may optionally determine whether the second computing device is subscribed to a topic associated with the message. For example, the process 600 may communicate with a subscription manager (as illustrated in FIG. 4) to determine whether the second computing device is subscribed to the topic. If the second computing device is subscribed to the topic, the process 600 may proceed to block 620. In some embodiments, block 615 may not be performed. For example, the process may proceed from block 610 to block 620.

At block 620, the process 600 may forward the message (e.g., transmit the message) to the second computing device. The message may be forwarded via the first virtual entity and the second virtual entity. For example, the process 600 may identify a node where the second virtual entity is located. The process 600 may forward the message directly to the identified node. In one embodiment, the process 600 may refrain from forwarding the message to other nodes in the messaging system. For example, the process 600 may transmit the message to only the identified node.

Figure 7:
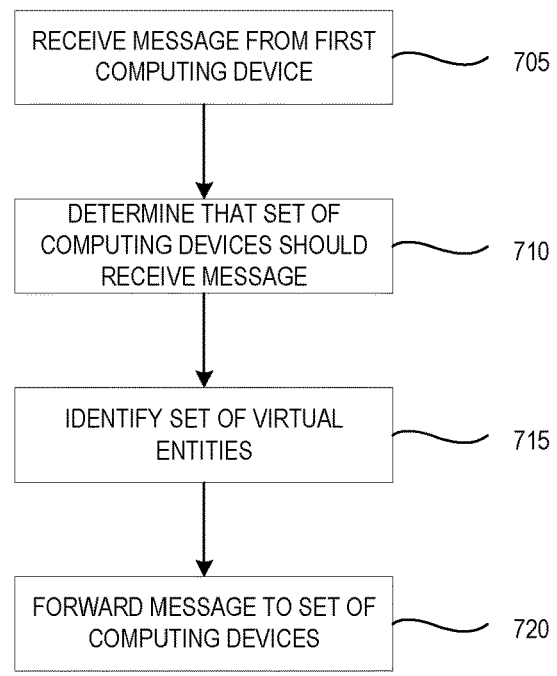
FIG. 7 is a flow diagram of a process for communicating messages via a messaging system (such as a pub-sub system), in accordance with one or more embodiments of the present disclosure.

FIG. 7 is a flow diagram of a process for communicating messages via a messaging system (such as a pub-sub system), in accordance with one or more embodiments of the present disclosure. Process 700 may be performed by processing logic that may comprise hardware (e.g., circuitry, dedicated logic, programmable logic, a field programmable gate array (FPGA), an application specific integrated circuit (ASIC), a processor, a processing device, a central processing unit (CPU), a system-on-chip (SoC), etc.), software (e.g., instructions running/executing on a processing device), firmware (e.g., microcode), or a combination thereof. In some embodiments, the process 700 may be performed by one or more of a computing device, a messaging system, a message processing system, a node, etc.

With reference to FIG. 7, process 700 illustrates example functions used by various embodiments. Although specific function blocks ("blocks") are disclosed in process 700, such blocks are examples. That is, embodiments are well suited to performing various other blocks or variations of the blocks recited in process 700. It is appreciated that the blocks in process 700 may be performed in an order different than presented, and that not all of the blocks in process 700 may be performed, and other blocks (which may not be included in FIG. 7) may be performed between the blocks illustrated in FIG. 7.

The process 700 begins at block 705 where the process 700 receives a message from a first computing device. The message may be received via a first virtual entity that is associated with the first computing device. The first virtual entity may be located on a first node in a first device connection system.

At block 710, the process 700 may determine that a set of computing devices should receive the message. For example, process 700 may identify a topic that is associated with the messages (e.g., may communicate with a subscription manager). The process 700 determine and/or identify computing devices that are subscribed to that topic.

The process 700 may also identify a set of virtual entities for the set of computing devices that are subscribed to the topic at block 715. For example, the process 700 may identify a virtual entity for each computing device. The process 700 may communicate with a device manager to identify the set of virtual entities. The process 700 may also determine a set of nodes where the set of virtual entities are located using the device manager.

At block 720, the process 700 may forward the message to the set of computing devices via the set of virtual entities. For example, the process 700 may forward the message directly from the first node to the set of nodes that were identified using the device manager. In one embodiment, the process 700 may refrain from forwarding the message to other nodes in the device connection system. For example, the process 700 may forward/transmit the message only to the identified nodes.

Figure 8:
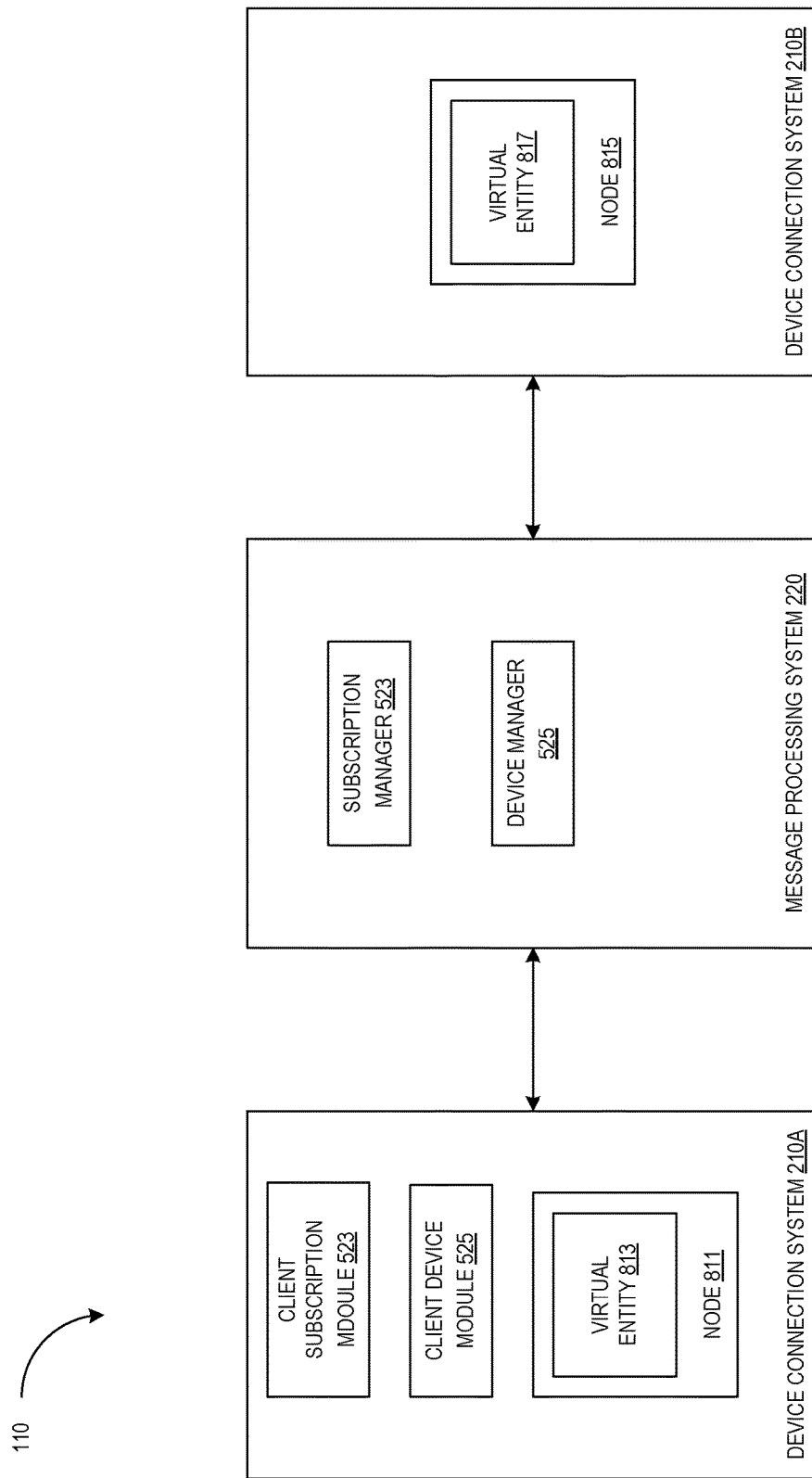
FIG. 8 is a block diagram illustrating an example messaging system, in accordance with one or more embodiments of the present disclosure.

FIG. 8 is a block diagram that illustrates an example messaging system 110, in accordance with one or more embodiments of the present disclosure. The messaging system 110 includes a device connection system 210A, a message processing system 220, and a device connection system 210B. The message processing system 220 includes a device manager 523 and a device manager 525.

As discussed above, the subscription manager 523 may track and/or manage topics and/or subscriptions to the topics. The subscription manager 523 may also allow computing devices to create a topic, delete a topic, modify a topic (e.g., modify a name/identifier for the topic, modify a description or other data for a topic, etc.). The subscription manager 523 may also track/manage subscriptions to the topics. Also, as discussed above, the device manager 525 may track and/or manage virtual entities that are associated with computing devices. The device manager 525 may also the nodes where virtual entities are located (e.g., may track the node where a specific virtual entity is located).

The device connection system 210A includes a node 811 and a virtual entity 813. The device connection system 210B includes a node 815 and a virtual entity 817. The nodes 811 and 815 may be similar to the nodes 311 described above. The virtual entities 813 and 817 may be similar to the virtual entities 313 described above.

The device connection system 210A also includes a client subscription module 523, and a client device module 525. In one embodiment, the client subscription module 523 may request subscription information from the subscription manager 523. For example, the client subscription module 523 may request information about topics and which computing devices are subscribed to which topics. The client device module 525 may request device information from the device manager 525. For example, the client device module 525 may identify virtual entities, the computing devices that are associated with the virtual entities, and the nodes where the virtual entities are located.

In one embodiment, the node 811 may instruct the message processing system 220 to transmit a message directly to one or more computing devices via one or more virtual entities 817 of the device connection system 210B. For example, the node 811 may identify virtual entities for computing devices that are subscribed to a topic of the message, and may identify the nodes where those virtual entities are located. The node 811 may then instruct the message processing system 220 to transmit the message directly to those identified nodes.

Figure 9:
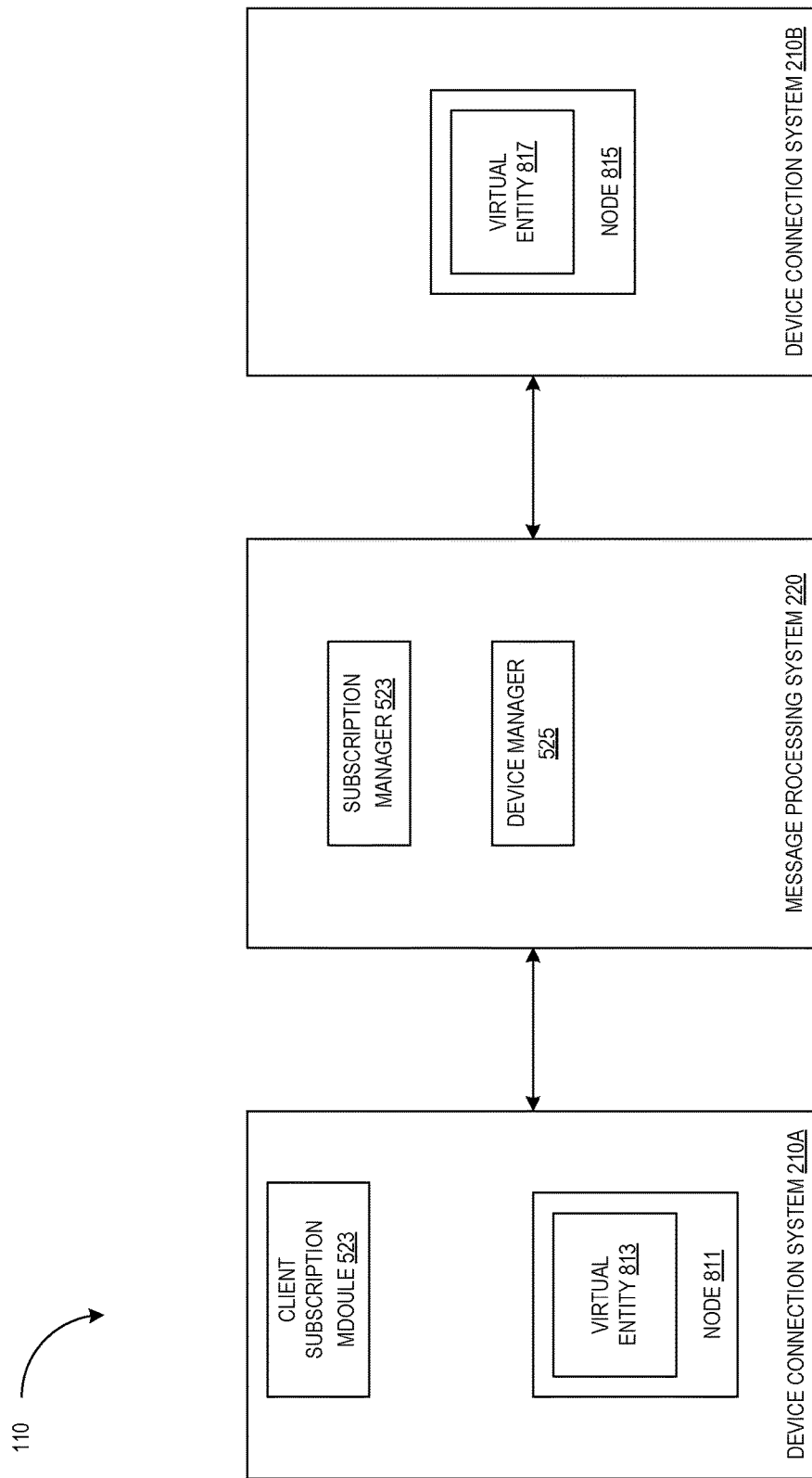
FIG. 9 is a block diagram illustrating an example messaging system, in accordance with one or more embodiments of the present disclosure.

FIG. 9 is a block diagram that illustrates an example messaging system 110, in accordance with one or more embodiments of the present disclosure. The messaging system 110 includes a device connection system 210A, a message processing system 220, and a device connection system 210B. The message processing system 220 includes a device manager 523 and a device manager 525.

As discussed above, the subscription manager 523 may track and/or manage topics and/or subscriptions to the topics. The subscription manager 523 may also allow computing devices to create a topic, delete a topic, modify a topic (e.g., modify a name/identifier for the topic, modify a description or other data for a topic, etc.). The subscription manager 523 may also track/manage subscriptions to the topics. Also, as discussed above, the device manager 525 may track and/or manage virtual entities that are associated with computing devices. The device manager 525 may also the nodes where virtual entities are located (e.g., may track the node where a specific virtual entity is located).

The device connection system 210A includes a node 811 and a virtual entity 813. The device connection system 210B includes a node 815 and a virtual entity 817. The nodes 811 and 815 may be similar to the nodes 311 described above. The virtual entities 813 and 817 may be similar to the virtual entities 313 described above.

The device connection system 210A also includes a client subscription module 523. In one embodiment, the client subscription module 523 may request subscription information from the subscription manager 523. For example, the client subscription module 523 may request information about which topics and which computing devices are subscribed to which topics. The node 811 may transmit the list of computing devices that are subscribed to the topic of the message, to the message processing system 220. The message processing system 220 may use the device manager 525 to identify virtual entities 817 of computing devices that are subscribed to the topic. The message processing system 220 may forward the messages directly to the identified virtual entities (e.g., to the nodes 815 where the virtual entities 817 are located).

Figure 10:
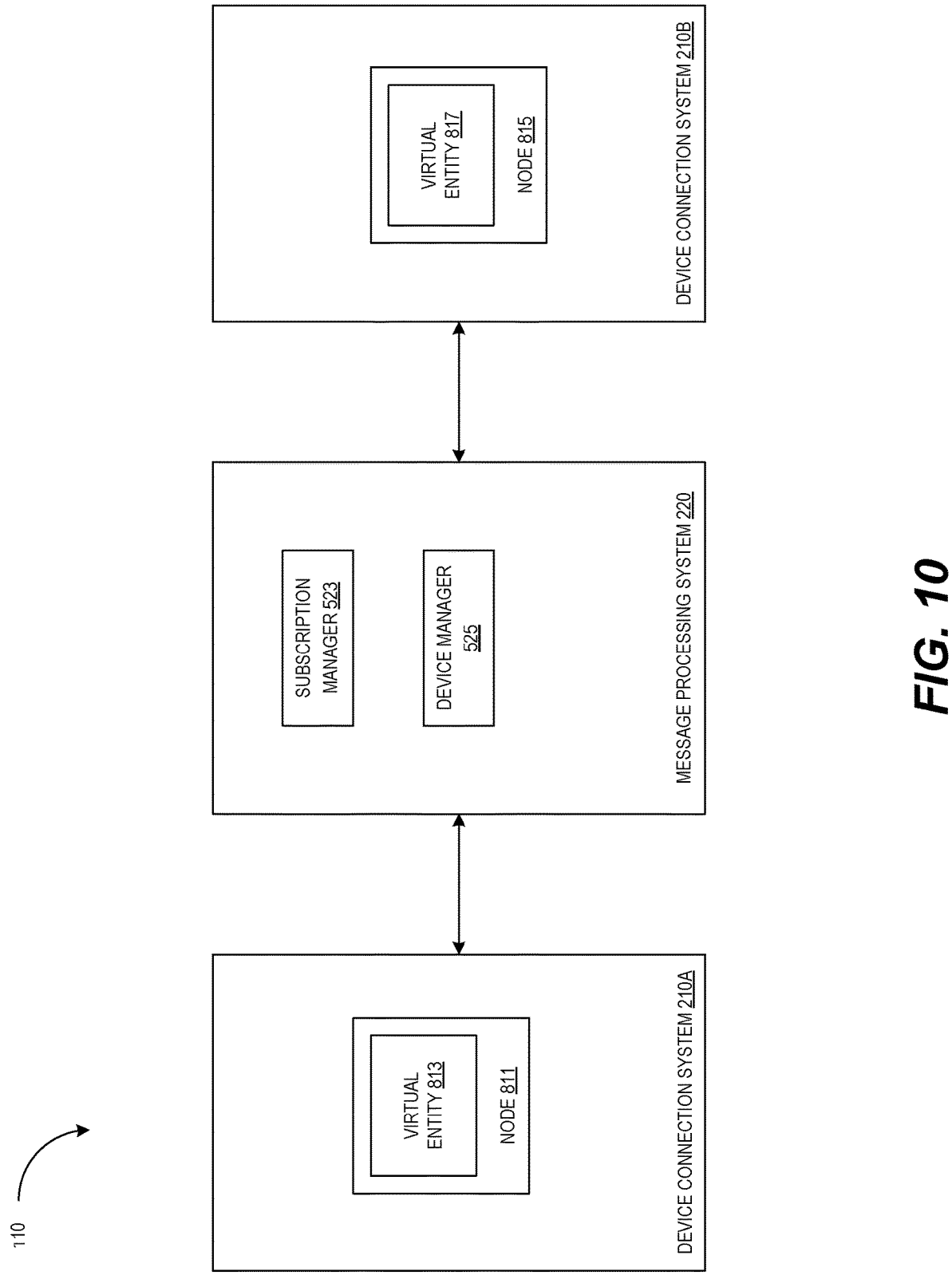
FIG. 10 is a block diagram illustrating an example messaging system, in accordance with one or more embodiments of the present disclosure.

FIG. 10 is a block diagram that illustrates an example messaging system 110, in accordance with one or more embodiments of the present disclosure. The messaging system 110 includes a device connection system 210A, a message processing system 220, and a device connection system 210B. The message processing system 220 includes a device manager 523 and a device manager 525.

As discussed above, the subscription manager 523 may track and/or manage topics and/or subscriptions to the topics. The subscription manager 523 may also allow computing devices to create a topic, delete a topic, modify a topic (e.g., modify a name/identifier for the topic, modify a description or other data for a topic, etc.). The subscription manager 523 may also track/manage subscriptions to the topics. Also, as discussed above, the device manager 525 may track and/or manage virtual entities that are associated with computing devices. The device manager 525 may also the nodes where virtual entities are located (e.g., may track the node where a specific virtual entity is located).

The device connection system 210A includes a node 811 and a virtual entity 813. The device connection system 210B includes a node 815 and a virtual entity 817. The nodes 811 and 815 may be similar to the nodes 311 described above. The virtual entities 813 and 817 may be similar to the virtual entities 313 described above.

In one embodiment, the node 811 may transmit a message to the message processing system 220 via the virtual entity 813. The message processing system 220 may use the subscription manager 523 to identify subscriptions to a topic for the message and may use the device manager 525 to identify virtual entities 817 of computing devices that are subscribed to the topic. The message processing system 220 may forward the messages directly to the identified virtual entities (e.g., to the nodes 815 where the virtual entities 817 are located).

Figure 11:
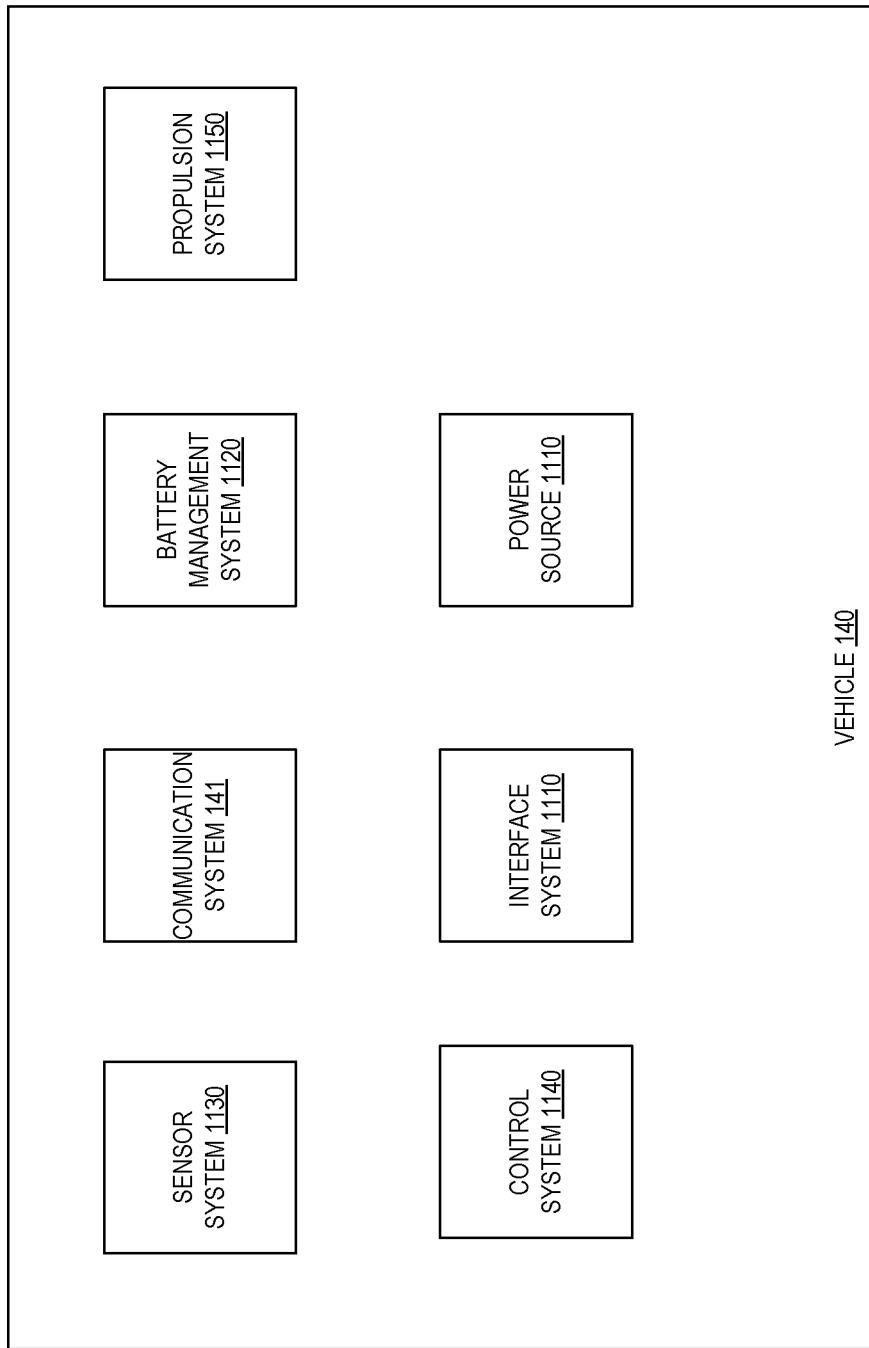
FIG. 11 is a block diagram illustrating an example vehicle, in accordance with one or more embodiments of the present disclosure.

FIG. 11 is a block diagram that illustrates an example vehicle 140, in accordance with one or more embodiments of the present disclosure. In one embodiment, the vehicle 140 may be an autonomous vehicle (e.g., a self-driving vehicle). For example, the vehicle 140 may be a vehicle (e.g., car, truck, van, mini-van, semi-truck, taxi, drone, etc.) that may be capable of operating autonomously or semi-autonomously. In another embodiment, the vehicle 140 may also be a vehicle with autonomous capabilities. A vehicle with autonomous capabilities may be a vehicle that may be capable of performing some operations, actions, functions, etc., autonomously. For example, vehicle 140 may have adaptive cruise control capabilities and/or lane assist/keep capabilities. A vehicle 140 with autonomous capabilities may be referred to as a semi-autonomous vehicle.

The vehicle 140 may include various systems that allow the vehicle 140 to operate specific functions. For example, vehicle 140 includes a sensor system 1130, a control system 1140, a communication system 141, an interface system 1110, a propulsion system 1150, a power source 1110, and a battery management system 1120. In other embodiments, the vehicle 140 may include more, fewer, and/or different systems, and each system may include more, fewer, and/or different components. Additionally, the systems and/or components may be combined and/or divided in any number/possibility of arrangements.

The sensor system 1130 may include one or more sensors (e.g., detectors, sensing elements, sensor devices, etc.). The one or more sensors may provide information about the operation of the vehicle 140, information about the condition of the vehicle 140, information about occupants/users of the vehicle 140, and/or information about the environment (e.g., a geographical area) where the vehicle 140 is located. The one or more sensors may be coupled to various types of communication interfaces (e.g., wired interfaces, wireless interfaces, etc.) to provide sensor data to other systems of the vehicle 140. For example, a sensor may be coupled to a storage device (e.g., a memory, a cache, a buffer, a disk drive, flash memory, etc.) and/or a computing device (e.g., a processor, an ASIC, an FPGA, etc.) via a control area network (CAN) bus (or other type of communication bus, such as a Flexray). In another example, a sensor may be coupled to a storage drive and/or a computing device via Bluetooth, Wi-Fi, etc. Examples of sensors may include, but are not limited to, tire pressure sensors, steering sensors (e.g., to determine the positions/angles of one or more wheels), a compass, temperature sensors, a global positioning system (GPS) receiver/sensor, a light detection and ranging (LIDAR) device/sensor, an ultrasonic device/sensor, a camera (e.g., a video camera), a radar device/sensor, etc.

The control system 1140 may include hardware, software, firmware, or a combination thereof that may control the functions, operations, actions, etc., of the vehicle 140. For example, the control system 1140 may be able to control a braking system and/or an engine to control the speed and/or acceleration of the vehicle 140. In another example, the control system 1140 may be able to control a steering system to turn the vehicle 140 left or right. In a further example, the control system 1140 may be able to control the headlights or an all-wheel drive (AWD) system of the vehicle 140 based on weather/driving conditions (e.g., if the environment has snow/rain, if it is nighttime in the environment, etc.). The control system 1140 may use sensor data and/or outputs generated by machine learning models to control the vehicle 140.

The control system 1140 may use outputs generated one or more machine learning models to control the vehicle. For example, control system 1140 may generate one or more steering commands based on the outputs of a machine learning model (e.g., based on objects detected by a machine learning model). The steering command may indicate the direction that a vehicle 140 should be turned (e.g., left, right, etc.) and may indicate the angle of the turn. The control system 1140 may actuate one or more mechanisms/systems (e.g., a steering system, a steering wheel, etc.) to turn the vehicle 140 (e.g., to control the vehicle 140) based on the steering command. For example, the control system 1140 may actuate one or more steering mechanisms that may turn/move the wheels of the vehicle by a certain number of degrees to steer the vehicle 140. The control system 1140 may also control acceleration and/or deceleration of the vehicle 140. For example, the control system 1140 may use the accelerator to speed up the vehicle 140 or may use the brake to slow down the vehicle 140.

The communication system 141 may include various devices, systems, components, software, hardware, firmware, etc., that allow the vehicle 140 to communicate (e.g., transmit and/or receive data) with various networks (e.g., computer networks, communication networks, etc.) and/or devices (e.g., other vehicles, server computers, etc.). For example, the communication system 141 may include antennas, network interfaces, wireless network interfaces (e.g., cellular, Wi-Fi, Bluetooth, ZigBee, ZWave, and/or other network interfaces). The communication system 141 may also allow the vehicle 140 to communicate with other vehicles (e.g., V2V communications), with infrastructure (e.g., V2I communications), and/or with other devices/networks (e.g., V2X communications). In one embodiment, the communication system 141 may allow the vehicle 140 to transmit messages to and/or receive messages from a messaging system (e.g., messaging system 110 illustrated in FIG. 1).

The interface system 1110 may include various devices, systems, components, software, hardware, firmware, etc., that allow the vehicle 140 to interact with external sensors, other vehicles, external computing devices, and/or a user. For example, the interface system 1110 may include buttons, knobs, dials, touch screens, microphones, cameras, and/or other devices that interact with a user, present information to a user, receive user input from a user, etc.

The propulsion system 1150 may include various devices, systems, components, software, hardware, firmware, etc., that may be used to move the vehicle 140. For example, the propulsion system 1150 may include an engine/motor, an energy source, a transmission, and wheels/tires. The engine/motor may include any combination of an internal combustion engine, an electric motor (that can be powered by an electrical battery, fuel cell, and/or other energy storage device), and/or a steam engine.

The power source 1110 may be a source of energy that provides power (e.g., energy, electricity, etc.) to various components, modules, and/or systems of the vehicle 140. For example, the power source 1110 may be used to power one or more of the sensor system 1130, control system 1140, communication system 141, interface system 1110, propulsion system 1150. Examples of power sources (e.g., energy sources) may include gasoline, diesel, propane, other compressed gas-based fuels, ethanol, solar panels, batteries, and other sources of electrical power. The power source 1110 may be a combination of multiple power sources (e.g., may include any combination of fuel tanks, batteries, capacitors, and/or flywheels). In one embodiment, the power source 1110 may be a battery (e.g., a lithium-ion battery, an electrical battery, etc.).

The battery management system (BMS) 1120 may include various devices, systems, components, software, hardware, firmware, etc., that may the various characteristics of the power source 1110. For example, if the power source 1110 is a battery, the BMS 1120 may monitor characteristics (e.g., operating parameters, conditions, etc.) such as battery temperature, battery voltage, battery current, battery charging and discharging data, etc. The characteristics can be stored locally in the vehicle 140 by the BMS 1120. The BMS 1120 can also transmit such monitored information via the communications system 141 to other devices (e.g., to a server computer, to a cloud, etc.). The BMS 1120 may also regulate the operating conditions of the power source 1110. For example, the BMS 1120 may cool the battery temperature to within a predefined threshold temperature.

Although not illustrated in FIG. 11, the vehicle 140 may also include various computing resources and/or devices. For example, the vehicle 140 may include hardware such as processing devices (e.g., processors, central processing units (CPUs), processing cores, graphics processing units (GPUS)), memory (e.g., random access memory (RAM), storage devices (e.g., hard-disk drive (HDD), solid-state drive (SSD), etc.), and other hardware devices (e.g., sound card, video card, etc.). The vehicle 140 may also include computing devices. The computing devices may comprise any suitable type of computing device or machine that has a programmable processor including, for example, a computer. In some examples, the computing devices may include a single machine or may include multiple interconnected machines (e.g., multiple computers configured in a cluster).

Figure 12:
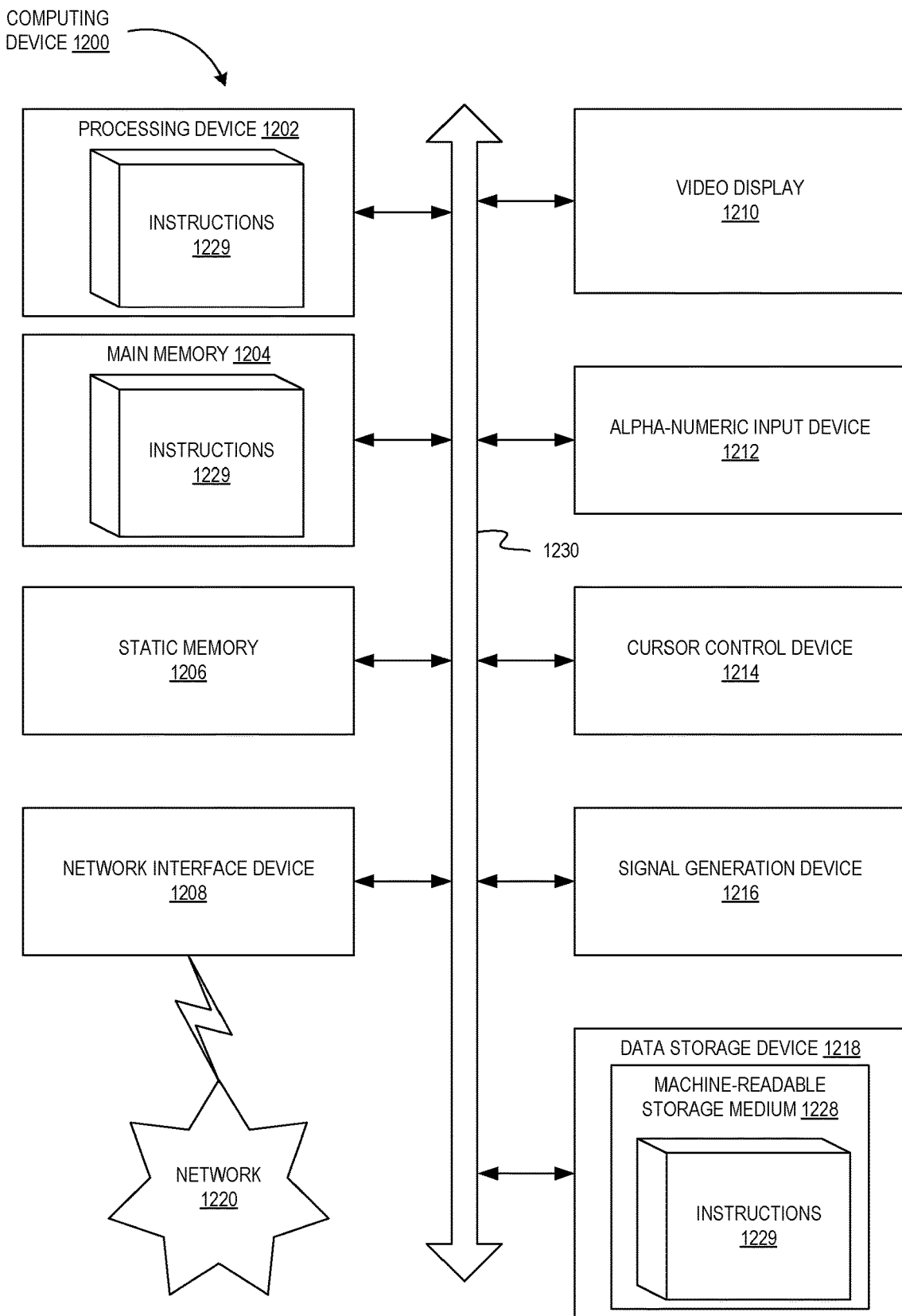
FIG. 12 is a block diagram of an example computing device that may perform one or more of the operations described herein, in accordance with some embodiments of the present disclosure.

FIG. 12 is a block diagram of an example computing device 1200 that may perform one or more of the operations described herein, in accordance with some embodiments. Computing device 1200 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1200 may include a processing device (e.g., a general purpose processor, a PLD, etc.) 1202, a main memory 1204 (e.g., synchronous dynamic random-access memory (DRAM), read-only memory (ROM)), a static memory 1206 (e.g., flash memory and a data storage device 1218), which may communicate with each other via a bus 1230.

Processing device 1202 may be provided by one or more general-purpose processing devices such as a microprocessor, central processing unit, or the like. In an illustrative example, processing device 1202 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1202 may also comprise one or more special-purpose processing devices such as an application specific integrated circuit (ASIC), a field programmable gate array (FPGA), a digital signal processor (DSP), network processor, or the like. The processing device 1202 may be configured to execute the operations described herein, in accordance with one or more aspects of the present disclosure, for performing the operations and steps discussed herein.

Computing device 1200 may further include a network interface device 1208 which may communicate with a network 1220. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and an acoustic signal generation device 1216 (e.g., a speaker). In one embodiment, video display unit 1210, alphanumeric input device 1212, and cursor control device 1214 may be combined into a single component or device (e.g., an LCD touch screen).

Data storage device 1218 may include a computer-readable storage medium 1228 on which may be stored one or more sets of instructions, e.g., instructions for carrying out the operations described herein, in accordance with one or more aspects of the present disclosure. Instructions 1220 implementing the different systems described herein (e.g., nodes, subscription manager, device manager, load balancer, virtual entities, device connection system message processing system, etc., may also reside, completely or at least partially, within main memory 1204 and/or within processing device 1202 during execution thereof by computing device 1200, main memory 1204 and processing device 1202 also constituting computer-readable media. The instructions may further be transmitted or received over a network 1220 via network interface device 1208.

While computer-readable storage medium 1228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "determining," "identifying," "transmitting," "receiving," "forwarding," "tracking," "allocating," "selecting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving a request, from a computing device, to connect to a publish-subscribe (pub-sub) system, wherein the pub-sub system comprises a plurality of nodes to process messages for the pub-sub system;
   allocating a virtual entity associated with the computing device in response to receiving the request to connect to the pub-sub system, wherein the virtual entity comprises an endpoint for the messages, wherein the messages comprise a first message published to a first topic of the pub-sub system and a second message addressed to the virtual entity, and wherein the virtual entity is located in a first node of the plurality of nodes; and
   forwarding the messages between the computing device and other computing devices via the virtual entity.

2. The method of claim 1, further comprising:
   selecting the first node from the plurality of nodes based on one or more node selection criterion.

3. The method of claim 1, wherein a network connection exists between the computing device and the first node.

4. The method of claim 1, further comprising:
   determining that the computing device should be moved to a second node of the plurality of nodes; and
   allocating a second virtual entity associated with the computing device, wherein the second virtual entity comprises an endpoint for the messages and wherein the second virtual entity is located in second node.

5. The method of claim 1, wherein the virtual entity is associated with an identifier that is unique within the pub-sub system.

6. The method of claim 1, further comprising:
   receiving a message for the computing device from another computing device via the pub-sub system; and
   transmitting the message to the computing device via the first virtual entity.

7. The method of claim 1, further comprising:
   receiving a message from the computing device for another computing device; and
   transmitting the message to the other computing device via the first virtual entity and the pub-sub system.

8. The method of claim 1, wherein the messages comprises one or more of:
   a message for subscribing the computing device to a topic; and
   a message published by another computing device for the topic.

9. The method of claim 1, wherein the computing device comprises a vehicle or a server computer.

10. A apparatus, comprising:
    a memory; and
    a processing device, communicatively coupled to the memory, the processing device configured to:
    receive a request, from a computing device, to connect to a publish-subscribe (pub-sub) system, wherein the pub-sub system comprises a plurality of nodes to process messages for the pub-sub system;
    allocate a virtual entity associated with the computing device in response to receiving the request to connect to the pub-sub system, wherein the virtual entity comprises an endpoint for the messages, wherein the messages comprise a first message published to a first topic of the pub-sub system and a second message addressed to the virtual entity, and wherein the virtual entity is located in a first node of the plurality of nodes; and
    forward the messages between the computing device and other computing devices via the virtual entity.

11. The apparatus of claim 10, wherein the processing device is further configured to:
    select the first node from the plurality of nodes based on one or more node selection criterion.

12. The apparatus of claim 10, wherein a network connection exists between the computing device and the first node.

13. The apparatus of claim 10, wherein the processing device is further configured to:
    determine that the computing device should be moved to a second node of the plurality of nodes; and
    allocate a second virtual entity associated with the computing device, wherein the second virtual entity comprises an endpoint for the messages and wherein the second virtual entity is located in second node.

14. The apparatus of claim 10, wherein the virtual entity is associated with an identifier that is unique within the pub-sub system.

15. The apparatus of claim 10, wherein the processing device is further configured to:
- receive a message for the computing device from another computing device via the pub-sub system; and
- transmit the message to the computing device via the first virtual entity.

16. The apparatus of claim 10, wherein the processing device is further configured to:
- receive a message from the computing device for another computing device; and
- transmit the message to the other computing device via the first virtual entity and the pub-sub system.

17. The apparatus of claim 10, wherein the messages comprises one or more of:
- a message for subscribing the computing device to a topic; and
- a message published by another computing device for the topic.

18. The apparatus of claim 10, wherein the computing device comprises a vehicle or a server computer.

19. The apparatus of claim 10, wherein the apparatus further comprises the pub-sub system.

20. A non-transitory computer-readable storage medium including instructions that, when executed by a processing device, cause the processing device to perform operations comprising:
- receiving a request, from a computing device, to connect to a publish-subscribe (pub-sub) system, wherein the pub-sub system comprises a plurality of nodes to process messages for the pub-sub system;
- allocating a virtual entity associated with the computing device in response to receiving the request to connect to the pub-sub system, wherein the virtual entity comprises an endpoint for the messages, wherein the messages comprise a first message published to a first topic of the pub-sub system and a second message addressed to the virtual entity, and wherein the virtual entity is located in a first node of the plurality of nodes; and
- forwarding the messages between the computing device and other computing devices via the virtual entity.

\* \* \* \* \*